Apr. 17, 1923.                            1,451,976
W. L. CHAMBERS
WHEEL RIM ADJUSTER
Filed July 19, 1922
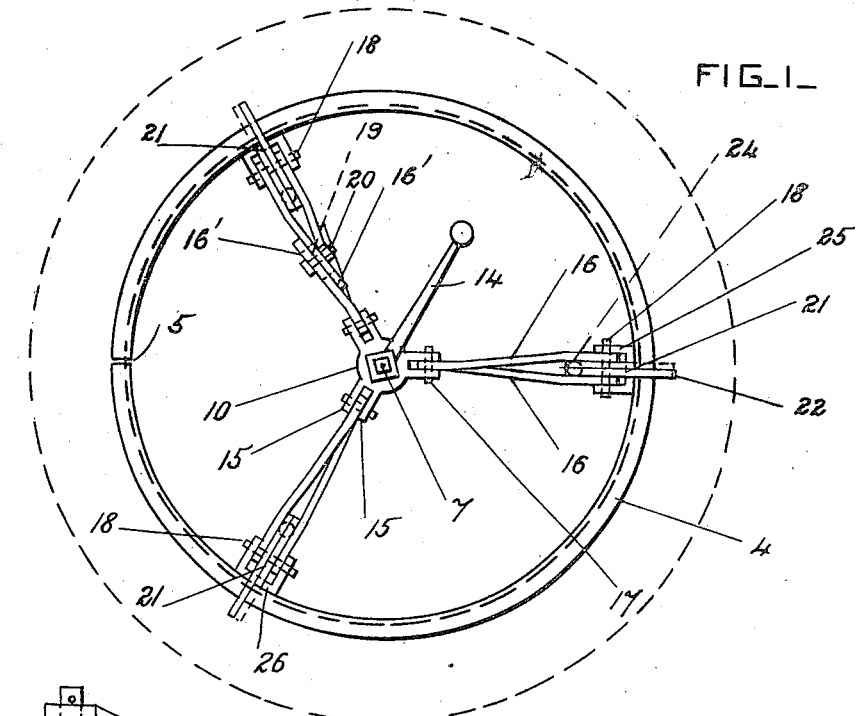
FIG_1_
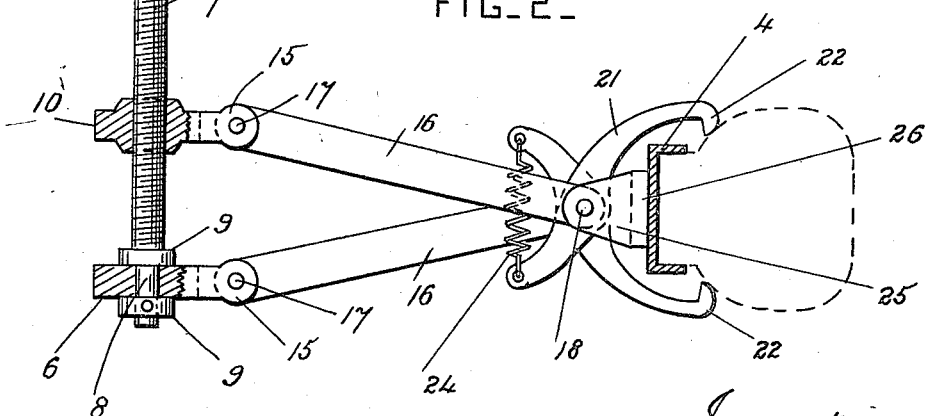
FIG_2_
Inventor
William L. Chambers
by Herbert W. Fenner,
Attorney.

Patented Apr. 17, 1923.

1,451,976

UNITED STATES PATENT OFFICE.

WILLIAM L. CHAMBERS, OF EDEN, UTAH.

WHEEL-RIM ADJUSTER.

Application filed July 19, 1922. Serial No. 575,976.

*To all whom it may concern:*

Be it known that I, WILLIAM L. CHAMBERS, a citizen of the United States, residing at Eden, in the county of Weber and State of Utah, have invented certain new and useful Improvements in Wheel-Rim Adjusters, of which the following is a specification.

This invention relates to devices for contracting the rims of wheels, so that they may be placed in position in the tires, and then expanding the rims so that they engage permanently with the tires; and it consists in the novel construction and combination of the parts hereinafter fully described and claimed.

In the drawings, Figure 1 is a plan view of a wheel rim adjuster constructed according to this invention. Fig. 2 is a section of the center portion of the expander showing one pair of its arms.

The wheel rims 4 are flanged, and are formed of metal which will spring to some extent, and they each have a gap 5. The end portions of the rim are slidable one over the other when the rim is contracted, and when the rim is expanded they come in line with each other, as shown in Fig. 1, so that their ends may be in abutment, and with the tire positioned in the channel of the rim. A pneumatic tire or any other approved form of tire may be connected to the wheel rim by means of this device.

A bearing or crosshead 6 is provided, and 7 is an operating screw, one end portion 8 of which is journaled in the bearing 6, and this screw is prevented from moving endwise by suitable collars 9.

A crosshead 10 is provided, and has a screwthreaded hole which engages with the screw 7, so that the crosshead is slid longitudinally on the screw when the screw is revolved by means of a crank 14 secured to it, or by any other approved means.

The bearing 6 and the crosshead 10 have radially projecting lugs 15, and 16 are arms arranged in pairs and pivoted to the lugs 15 at their inner ends by pins 17. The outer end portions of each pair of arms are pivotally connected together by a pin 18.

Three pairs of arms are provided, and they project radially of the axis of the operating screw. The arms of one pair are shown made in two parts 16' which overlap each other and are provided with slots 19 and bolts 20 for securing them together after their length has been adjusted. It is ordinarily preferable to construct one pair of the arms in this way, but all of them may be made adjustable or not, as desired.

A grapple 21 having crossed arms is pivoted on each pin 18 between the arms 16, and its hooked outer ends 22 are adapted to engage with the flanges of the wheel rim. A spring 24 is secured between the inner end portions of the arms of the grapple, and holds the hooked ends 22 in engagement with the flanges, but permits the ends to be spread apart easily.

A forked expanding bracket 25 is pivoted on each pin 18, and is arranged to straddle the arms 16. The crosspiece 26 of this bracket is arranged to abut against the inner surface of the wheel rim and effect its expansion.

The device is applied to the wheel rim when the ends of the rim are out of line with each other, and the screw is revolved in one direction so as to move the crosshead 10 away from the bearing or crosshead 6. The grapples engage with the flanges of the wheel rim and contract it so that it can be placed in position in a pneumatic tire. The screw is then revolved in the reverse direction so as to expand the rim until its overlapping end portions are moved into line with each other, and the tire is seated securely in the channel of the rim between its side flanges. When the expanding brackets engage the rim, the hooks of the grapples are spread apart by contact with the sides of the tire.

What I claim is:

1. A wheel rim adjuster, comprising an operating screw, two crossheads operatively connected with the said screw, radial arms arranged in pairs and pivoted at their inner ends to the respective crossheads, grapples pivoted to the outer end portions of the said arms and adapted to engage with the flanges of a wheel rim, each grapple being pivoted directly to the pair of arms to which it pertains by a single pivot pin, and expanding brackets also pivoted to the said arms by the same pivot pins as the said brackets and adapted to bear on the inner surface of the wheel rim.

2. A wheel rim adjuster, comprising an operating screw, two crossheads operatively connected with the said screw, radial arms arranged in pairs and pivoted at their inner ends to the respective crossheads, spring-pressed grapples having crossed arms adapted to engage with the flanges of a wheel rim, each grapple having its arms pivoted directly to and arranged between the outer end portions of the pair of arms to which it pertains by a single pivot pin, and forked expanding brackets which straddle the outer end portions of the said pairs of arms and are pivoted to them by the same pins as the grapples, said brackets being adapted to bear against the wheel rim.

In testimony whereof I have affixed my signature.

WILLIAM L. CHAMBERS.